United States Patent [19]

Priesemuth

[11] 4,057,870
[45] Nov. 15, 1977

[54] WINDSHIELD WIPER BLADE

[76] Inventor: Wolfgang Priesemuth, Postkamp 13, D-2210 Itzehoe-Nordoe, Germany

[21] Appl. No.: 619,394

[22] Filed: Oct. 3, 1975

[30] Foreign Application Priority Data

Oct. 8, 1974  Germany ............................ 2447923

[51] Int. Cl.$^2$ .............................................. B60S 1/04
[52] U.S. Cl. .................................. 15/250.41; 15/250.03
[58] Field of Search ............ 15/250.40, 250.41, 250.36, 15/250.37, 250.42, 250.03

[56] References Cited

U.S. PATENT DOCUMENTS

| 1,658,101 | 2/1928 | Seveke | 15/250.03 |
|---|---|---|---|
| 2,013,200 | 9/1935 | Conway | 15/250.40 |
| 2,085,608 | 6/1937 | Rodrick | 15/250.03 |
| 2,179,454 | 11/1939 | Paulus | 15/250.40 |
| 2,663,889 | 12/1953 | Fuglie | 15/250.41 |
| 2,750,617 | 6/1956 | Oishei | 15/250.37 |
| 3,092,867 | 6/1963 | Ziegler | 15/250.42 |
| 3,121,901 | 2/1964 | Reynolds | 15/250.03 |
| 3,631,561 | 1/1972 | Aszkenas | 15/250.41 |
| 3,639,938 | 2/1972 | Golden | 15/250.40 |

FOREIGN PATENT DOCUMENTS

| 854,122 | 6/1940 | France | 15/250.40 |
|---|---|---|---|

Primary Examiner—Richard E. Aegerter
Assistant Examiner—John W. Shepperd
Attorney, Agent, or Firm—Walter Becker

[57] ABSTRACT

A windshield wiper blade and an attachment therefor in which a body of porous material is supported on the blade at each side of the wiping edge thereof and which bodies engage the windshield when the wiper blade deflects laterally when in use. The porous material is laden with a cleaning agent which assists in cleaning the windshield. The bodies may be interconnected and form a single body and are detachably connected to the wiper blade.

9 Claims, 8 Drawing Figures

WINDSHIELD WIPER BLADE

The present invention relates to a windshield wiper with a wiper blade provided with a wiper edge and held by resilient holding means. More specifically, the present invention relates to a windshield wiper of the above mentioned type with supports of rubber-like material for storing and distributing a cleaning fluid. These supports are arranged on both sides of the wiper blade, are flat and adapted to engage the windshield to be cleaned while being combined so as to form a frame. These supports are at that side thereof which faces away from the windshield exchangeably connected to the wiper blade by means of a likewise frame-shaped sheet metal member.

A windshield wiper of the above mentioned type has proved very satisfactory in practice. The cleaning fluid is by means of the supporting body which is exchangeably arranged on the wiper blade proper, uniformly distributed over the entire windshield to be cleaned so that also a rather dirty windshield can by cleaning fluid quickly and safely be cleaned.

A windshield wiper of the above mentioned type has been disclosed in German Gebrauchsmusterschrift No. 7239051. The frame-shaped sheet metal member has at its outer edge a marginal flange which is closed in itself and is angled off toward the bottom side. The likewise frame-shaped supporting body is held by clamping means in this pan or vat-shaped sheet metal member. The sheet metal member has at its closed inner edge teeth directed toward the outside by means of which said sheet metal member engages a transverse web of the wiper blade proper.

The present invention relates to a further development of the above mentioned known windshield wiper. More specifically, it is an object of the present invention so to improve the above mentioned windshield wiper that the connection between the supporting body and the frame-shaped sheet metal member is improved while the manufacture of these structural elements will be facilitated.

It is another object of this invention to provide a windshield wiper of the above mentioned type which will have a greatly improved cleaning effect.

These and other objects and advantages of the invention will appear more clearly from the following specification, in connection with the accompanying drawings, in which.

Figure 1:
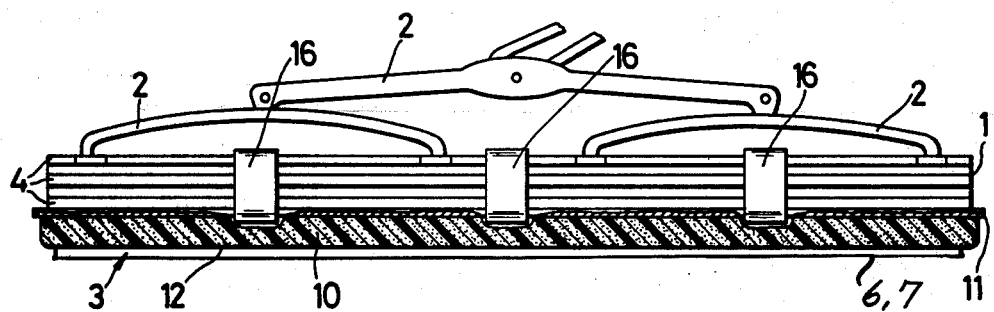
FIG. 1 illustrates a side view of a windshield wiper according to the invention.

The windshield wiper according to the present invention is characterized primarily in that the above mentioned sheet metal member is designed as a flat steel blade to which the frame-shaped supporting body is connected by being cemented or vulcanized thereto. Due to the above mentioned features, a firm and permanent connection is obtained between the supporting body and the sheet metal member. The sheet metal member is plane and thus can easily be made from thin steel sheet metal.

In order to make a connection as simple as possible between the supporting body to the sheet metal member on one hand and the wiper blade on the other hand, it is preferred when the longitudinal inner edges of the steel blade frame is provided with inwardly pointing protrusions to which no supporting body is connected. The steel blade frame thus projects with these protrusions into a corresponding recess between transverse webs of the wiper blade and is held there. According to a further preferred embodiment of the invention, the two rows of projections are so arranged that a gap exists therebetween. In this way, a particularly favorable distribution of the forces will be realized which further increases the life span of the structural elements.

For purposes of connecting the supporting body to the spring yoke of the windshield wiper, it is preferred when to the longitudinal outer edges of the steel blade frame there are connected areas which are located in pairs opposite to each other and which are not connected to the supporting body while said areas are engaged by inwardly bent legs of clamping yokes which are connected to the windshield wiper. This clamping yoke which is somewhat U-shaped thus extends from above over the frame-shaped supporting body and has its inwardly pointing legs engage the bottom side of the areas which at this place are not covered with the rubber of the supporting body, whereby the desired connection with the windshield wiper is realized. A plurality of such resilient yokes are combined and is spaced relationship to each other are provided on a windshield wiper.

For purposes of further improving the cleaning effect, the windshield wiper according to the invention is characterized in that the engaging surface of the supporting body has a rib-shaped profile while the ribs confine an acute angle with the longitudinal central axis of the supporting body.

During the wiping operation, the ribs arranged in the above mentioned manner feed the cleaning fluid toward the outside whereby the windshield is particularly quickly and well cleaned. It has been found that for the said angle, an angle of 15° is particularly favorable. The angle should generally be within the range of from 10° to 20°.

In order to assure that the cleaning liquid during the wiping operation is transported to one and the same side of the windshield wiper, the ribs on the two longitudinal edges of the frame of the supporting body are preferably extending in opposite directions to each other. Due to the fact that with each wiping operation the respective front portion of the supporting body conveys the major portion of the cleaning liquid, and inasmuch as after reversing the direction of rotation, that section of the supporting body which first is located at the rear and in wiping direction will then be located in the front, the above outlined features bring about that with each wiping operation, the cleaning fluid is conveyed in a preferred manner to one of the two narrow edges of the windshield wiper.

Due to the angle of inclination which during the cleaning operation occurs between the windshield wiper and the surface to be cleaned, it is furthermore preferred that the height of the ribs increases from the outside toward the interior. This feature brings about that with every wiping operation, the ribs of the respective front section of the supporting body will work in approximately one plane.

A further embodiment of a windshield wiper according to the invention is characterized in that on the engaging surface of the supporting body, bristles are provided. Also with bristles of that type which form one piece and consisting of synthetic material there may be extruded together with the supporting body, a particularly good cleaning effect will be obtained. This is due to the fact that bristles of this type can most easily yield to occurring unevenness on the windshield to be cleaned without lifting off the adjacent areas of the wiper blade or supporting body.

Referring now to the drawings in detail, there may first be explained the principal build-up of a windshield wiper according to the invention.

Figure 2:
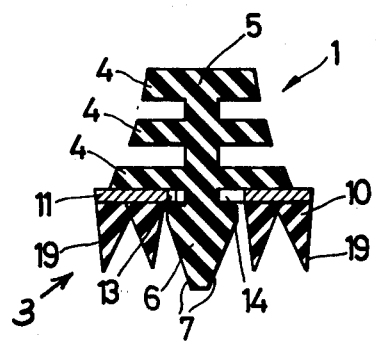
FIG. 2 represents a section taken along the line II—II of FIG. 4.

The illustrated windshield wiper consists primarily of a wiper blade 1 having an elongated at least latera-ly resilient central body comprising a central longitudinal rib, resilient yokes 2 and a supporting body 3. The wiper blade 1 is provided with a plurality of transverse webs 4 which extend parallel to each other and of which the uppermost one forms a base portion which fastened in the resilient yoke 2. The central sections of the transverse webs 4 are interconnected by means of a central longitudinal rib or narrow intermediate web 5 (see also FIGS. 2 and 3) which web 5 is extended below that transverse web which represents the lowermost web and faces the windshield to be cleaned. At this region the web 5 takes on a contour which in cross section is wedge-shaped. The central web 5 and the front section 6 during the wiping operation are deformed in such a way that the front portion 6 tilts and with its wiping surfaces 7 slides over the surface to be cleaned. In order to aid a corresponding deformation of the central web 5, the latter as those sections which are located between the transverse webs 4 are designed relatively narrow.

Figure 4:
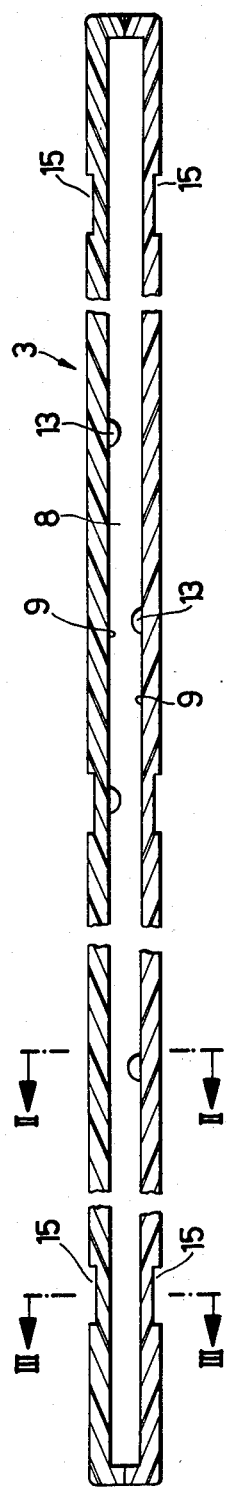
FIG. 4 is a bottom view of a frame-shaped supporting body of rubber with a steel blade connected thereto.

The supporting body 3 has a narrow longitudinal central opening 8 (see FIG. 4). This opening 8 is so designed that the front section 6 of the blade can be passed therethrough. If the material of the body 3 is not sufficiently elastically deformable, there will remain a free space between the wiping surfaces 7 and the lateral walls 9 of the central opening 8, which space does not impede the movement of the front portion 6 of the blade.

The body 3 represents a rubber-like supporting element or framelike supporting body 10 of a suitable material, preferably rubber. A metal plate or flat steel blade 11 which may likewise have the shape of a frame is connected to the flat top side of the body 10 by vulcanization or by the application of an adhesive. The thickness of the body 10 is so dimensioned that the edge means of the front portion 6 of the blade, in non-deformed condition of the central web protrudes from that bottom side 12 of the body 10 which faces toward the surface to be cleaned. During the wiping operation, the central web 5 is deformed to such an extent that the bottom side 12 is pressed upon the surface to be cleaned and the wiping surface 7 extends in a plane with the bottom side 12. The body 10 is thus arranged outside the tilting region of the front portion 6.

The tilting blade 11 is at its inner side provided with protrusions or projections 13 arranged in spaced relationship to each other and engaging in a groove formed between the lowermost transverse web 4 and the front portion 6. In order to form interfitting elements of connecting means on the plate 11 and central body, these projections or protrusions 13 which are not rubberized or adhesive covered engage the annular space 14 which is provided between the bottom side of the lowermost transverse web 4 and the top side of the here widening front portion 6.

Figure 3:
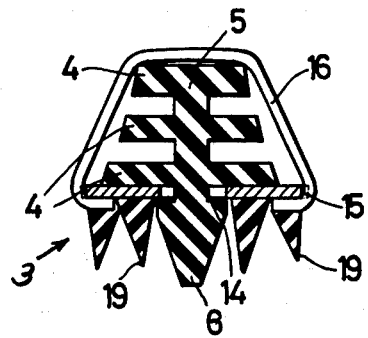
FIG. 3 represents a section taken along the line III—III of FIG. 4.
Figure 8:
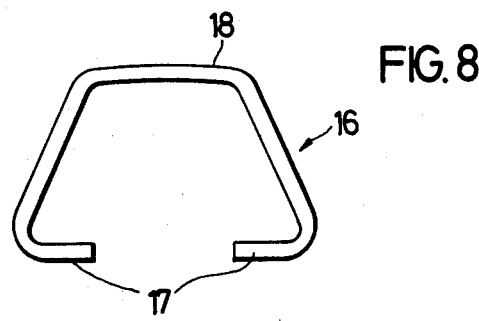
FIG. 8 shows a view of the clamping yoke.

Furthermore, the steel blade 11 is not rubberized or adhesive covered at the areas 15 which are located in spaced relationship to each other and in pairs opposite to each other at the outer edge of the steel blade 11 (see also FIG. 3). A clamping yoke 16 which in its entirety is shown in side view in FIG. 8 and which is also shown in FIG. 3 has the upper sides of its inwardly pointing legs engage the bottom side of the areas 15 of the steel blade 11, thereby holding the steel blade and together therewith the supporting body 10 connected thereto, on the wiper blade 1. The base 18 of the yoke 16 rests on the base formed by the uppermost transverse web 4.

Figure 7:
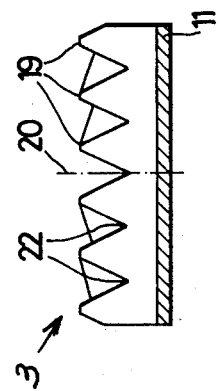
FIG. 7 is a view, partially sectioned of the supporting body with a steel blade along the central longitudinal plane of the supporting body, likewise seen in the direction from the inside toward the outside.
Figure 6:
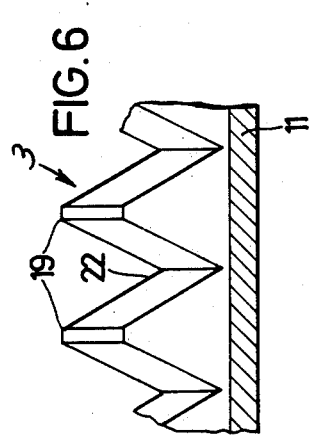
FIG. 6 represents a view, partly sectioned of the supporting body with a steel blade seen in the direction of the ribs from the inside toward the outside.
Figure 5:
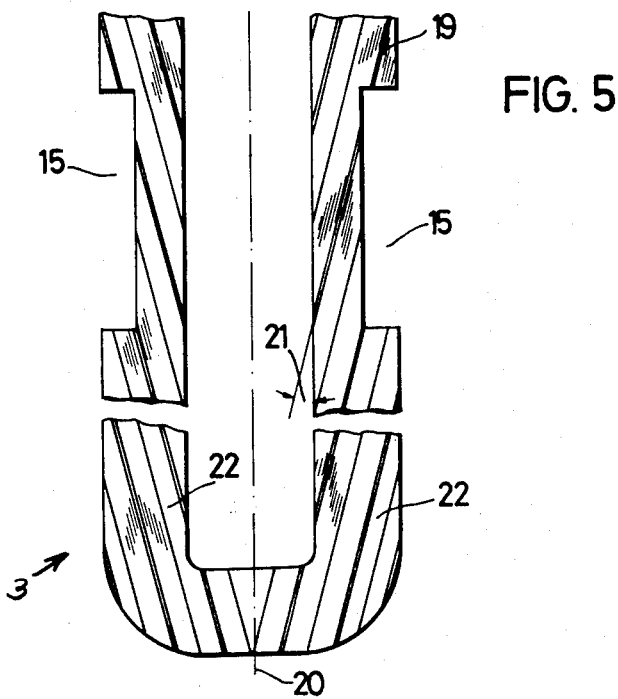
FIG. 5 shows on a larger scale than the preceding figures one end of the supporting body shown in FIG. 4.

As will be evident from FIGS. 5 to 7, the bottom side of the supporting body 10 is provided with ribs 19 which extend parallel to each other and which by means of the central longitudinal plane 20 of the support 3 define an acute angle 21 of about 15°. The said ribs are arranged in the manner of a fish bone with regard to the central longitudinal plane 20. The valleys which separate the ribs from each other are designated with the reference numerals 22. The ribs are in FIG. 5 shown by thin lines. Instead of the rib-shaped design of the supporting body 10, as illustrated in FIGS. 2–7, said rubber-like element or supporting body 10 may also be made of foam-like material, for instance, open porous synthetic material, as shown in FIG. 1. In FIG. 1 the connection of the support 3 is effected by means of the yoke 16. The ribs have their edges preferably slightly rounded. Instead of the ribs, however, also bristles may be provided which may consist of synthetic material and by extruding may be connected to the steel blade 11 so as to form a single integral piece.

It will be evident that the frame-like body 3, including plate 11 can be made in two parts with one part placed on each side of blade 1 and with the parts held in place of the clips 16 and of the projections 13 on blade 11 which engage the wiper blade just above the tapered portion 6 and from opposite sides of the blade.

It is, of course, to be understood that the present invention is, by no means, limited to the specific showing in the drawings, but also comprises any modifications within the scope of the appended claims.

What is claimed is:

1. A windshield wiper assembly comprising resilient mounting means, a wiper blade of resilient material having a base portion secured to said resilient mounting means, a central longitudinal web integral with said base portion and a longitudinal wiping portion integral with said longitudinal web and engageable with the surface of a windshield, said wiping portion being wider than said web and spaced from the base, auxiliary wiper means mounted on said wiper blade comprising a supporting wiper structure extending the length of said wiper blade on each side of said wiping portion to form a frame having longitudinal elements spaced by less than the width of said wiping portion, with each of said elements fixed to and supported by said web on each side between said base portion and said wiping portion, and an auxiliary wiper body of resilient material secured on said element on each side, said auxiliary wiper body being of less height from said element than said wiping portion and formed with an edge for engagement with the surface of the windshield, said central longitudinal web flexing under engagement of said wiping portion with the surface of the windshield to cause engagement of one of said auxiliary wiper bodies on one side of said wiping portion with said surface, and connecting elements extending between said base portion of said wiper blade and underlying said wiper structure elements on opposite sides of said wiping portion to retain said supporting wiper structures on said wiper blade while allowing flexing of said central web with said wiping portion and said supporting structures.

2. A windshield wiper assembly according to claim 1 in which said blade comprises longitudinal webs projecting laterally from opposite sides of said central web, said elements comprising projections thereon extending into the space between said base and said wiping portion.

3. A windshield wiper assembly according to claim 1 in which said elements on each side of said web are formed by a plate which has a longitudinal central slot through which said other wiping portion extends.

4. A windshield wiper assembly according to claim 3 in which said connecting elements include spring clip means which extend across said base portion and which have leg elements extending to said plate and bent over said plate, said clip means being spaced along the length of said wiper blade.

5. A windshield wiper assembly according to claim 1 in which said wiper bodies are formed of porous material and are adapted to be laden with cleaning agent to be released to the windshield surface during a wiping operation.

6. A windshield wiper assembly comprising resilient mounting means, a wiper blade of resilient material having a base portion secured to said resilient mounting means, a central longitudinal web integral with said base portion and a longitudinal wiping portion integral with and wider than said longitudinal web and engageable with the surface of a windshield, said blade having grooves along opposite sides between said wiping portion and said base, metal plate means on opposite sides of said blade supported by said blade and including means to fix their edges in said grooves, longitudinal wiper bodies secured to said metal plate means on opposite sides of said blade, said wiper bodies being of less height from said metal plate means than said wiping portion, so that a wiper body on one side engages said windshield when said blade is deformed by engagement of said wiper portion with the surface of said windshield, each said wiper body having wiping edges formed as parallel projections spaced along said each body, and at an angle to the longitudinal side of said body, and connecting elements retaining said metal plate means on said blade.

7. A windshield wiper assembly according to claim 6 in which said projections are in the form of ribs which form an acute angle of about 15 degrees with the side of the blade.

8. A windshield wiper assembly according to claim 7 in which the ribs of the respective elements on opposite sides are inclined so as to extend and converge with one another toward the side of the blade.

9. A windshield wiper assembly according to claim 7 in which the height of the ribs increases in the direction from outside to inside of the blade.

* * * * *